US008756284B2

(12) United States Patent
Murphy et al.

(10) Patent No.: US 8,756,284 B2
(45) Date of Patent: Jun. 17, 2014

(54) MINIMIZING INCORRECTLY ADDRESSED COMMUNICATIONS WHEN WORKING WITH AMBIGUOUS RECIPIENT DESIGNATIONS

(75) Inventors: Thomas E. Murphy, Vestal, NY (US); George E. Corbin, Hyde Park, NY (US); Michael D. Essenmacher, Red Hook, NY (US); Thomas E. Murphy, Jr., Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 12/134,246

(22) Filed: Jun. 6, 2008

(65) Prior Publication Data

US 2009/0307316 A1    Dec. 10, 2009

(51) Int. Cl.
*G06F 15/16* (2006.01)
(52) U.S. Cl.
USPC ............ 709/206; 709/205; 709/207; 709/204
(58) Field of Classification Search
USPC .................................. 709/204, 205, 206, 207
See application file for complete search history.

(56) References Cited

U.S. PATENT DOCUMENTS

| | | | |
|---|---|---|---|
| 6,564,264 B1 | 5/2003 | Creswell et al. | |
| 6,684,238 B1 * | 1/2004 | Dutta | 709/206 |
| 7,337,448 B1 | 2/2008 | Dalia et al. | |
| 7,430,580 B2 | 9/2008 | Baratakke et al. | |
| 2002/0023181 A1 | 2/2002 | Brown et al. | |
| 2002/0042815 A1 * | 4/2002 | Salzfass et al. | 709/206 |
| 2002/0087647 A1 * | 7/2002 | Quine et al. | 709/206 |
| 2002/0143879 A1 | 10/2002 | Sommerer | |
| 2002/0188683 A1 * | 12/2002 | Lytle et al. | 709/206 |
| 2003/0110223 A1 | 6/2003 | Hamilton et al. | |
| 2003/0120733 A1 * | 6/2003 | Forman | 709/206 |
| 2003/0135567 A1 | 7/2003 | Reilly | |
| 2004/0181586 A1 | 9/2004 | Morreale et al. | |
| 2004/0215726 A1 | 10/2004 | Arning et al. | |
| 2004/0249951 A1 * | 12/2004 | Grabelsky et al. | 709/227 |
| 2005/0135681 A1 * | 6/2005 | Schirmer | 382/229 |
| 2005/0278430 A1 * | 12/2005 | Cato | 709/206 |
| 2006/0031772 A1 | 2/2006 | Valeski | |
| 2007/0050456 A1 | 3/2007 | Vuong et al. | |
| 2007/0106731 A1 | 5/2007 | Bhakta et al. | |
| 2007/0106741 A1 * | 5/2007 | Christoff et al. | 709/206 |
| 2007/0124394 A1 | 5/2007 | Farrell et al. | |
| 2008/0021962 A1 | 1/2008 | Ryan et al. | |

(Continued)

OTHER PUBLICATIONS

Network Working Group Request for Comments 2822, P. Resnick, Apr. 2001.

(Continued)

*Primary Examiner* — Harunur Rashid
(74) *Attorney, Agent, or Firm* — William A. Kinnaman, Esq.; Kevin P. Radigan, Esq.; Heslin Rothenberg Farley & Mesiti P.C.

(57) ABSTRACT

Sending communications to incorrect recipients is minimized. Recipients that have ambiguous names or other designations are marked as ambiguous. Then, in response to including one of those names or designations in a communication, the originator of the communication is automatically warned of the ambiguity. This enables the originator to reconfirm that the communication is being sent to the intended recipient.

17 Claims, 6 Drawing Sheets

(56) References Cited

U.S. PATENT DOCUMENTS

| | | |
|---|---|---|
| 2008/0040432 A1 | 2/2008 | Murphy et al. |
| 2008/0071867 A1 | 3/2008 | Pearson et al. |
| 2008/0104075 A1 | 5/2008 | Heumesser |
| 2008/0104190 A1 | 5/2008 | Morreale et al. |
| 2008/0133677 A1 | 6/2008 | Pattabhiraman et al. |
| 2008/0168373 A1 | 7/2008 | Wilson |
| 2008/0301454 A1 | 12/2008 | Malcolm et al. |
| 2009/0089382 A1 | 4/2009 | Garrett |
| 2009/0094335 A1 | 4/2009 | Edmonds et al. |
| 2009/0132664 A1 | 5/2009 | Radenkovic et al. |
| 2009/0182824 A1 | 7/2009 | Haynes et al. |
| 2009/0240657 A1 | 9/2009 | Grigsby et al. |

OTHER PUBLICATIONS

Moore, K., G. Vaudreuil, "Network Working Group Request for Comments 3464", Jan. 2003.
Office Action for U.S. Appl. No. 12/134,248 dated Jun. 8, 2010.
Office Action for U.S. Appl. No. 12/234,242 dated May 4, 2010.
Final Office Action for U.S. Appl. No. 12/134,242 dated Oct. 13, 2010.
Final Office Action for U.S. Appl. No. 12/134,238 dated Mar. 3, 2011.
Final Office Action for U.S. Appl. No. 12/134,248 dated Dec. 2, 2010.
Essenmacher et al., Office Action for U.S. Appl. No. 12/134,238 (U.S. Patent Publication No. 2009/0307271 A1), dated Feb. 1, 2012.
Office Action for U.S. Appl. No. 12/134,248 dated Mar. 15, 2011.

\* cited by examiner

200

202 — To: Mary Smith <mary@example.net>, Jack Smith<jack@example.net>, John Brown<jbrown@nowheres.org>

204 — cc: John Doe<doej@example.net>, Lisa Riley<lriley@somewhere.org>, Fred Blue<fblue@example.net>, Steve Wolf<swolf@anywhere.net>

206 — bcc:

208 — Subject: New Security Exploit

210 — Body of Message

FIG. 2

MINIMIZING INCORRECTLY ADDRESSED COMMUNICATIONS WHEN WORKING WITH AMBIGUOUS RECIPIENT DESIGNATIONS

TECHNICAL FIELD

This invention relates, in general, to communications, and in particular, to minimizing the chances of sending a communication to an incorrect recipient.

BACKGROUND OF THE INVENTION

There are various modes of communication used today, including telephonic communication, facsimile communication, and electronic communication, as examples. In recent years, electronic communication has become a preferred medium of communication for many businesses and individuals. Electronic communication includes electronic mail, also known as email or e-mail, and instant messaging, as examples. The preference for electronic communication stems from the many advantages that are provided by this mode of communication. People have always wanted to correspond with one another in the fastest way possible. Electronic mail is advantageous over regular mail in this respect as it provides a near instantaneous form of communication. Prior to e-mail, first telegraph, and then later facsimile, provided similar instantaneous forms of communication, but in both cases, the steps leading to sending and then ultimately steps involved in receiving this instant communication were burdensome. By contrast, once means of communication is established, electronic mail or other electronic communications do not provide any additional burdens either for the sender sending the communication or the receiver receiving the communication.

The popularity of electronic communication has lead both individuals and businesses to rely heavily on this form of communication. Electronic communication allows people to write back and forth without having to spend much time worrying about how the message actually gets delivered. As technology grows closer and closer to being a common part of daily life, the reliance of both individuals and businesses on this medium of communication is sharply increasing.

Electronic communications rely on addresses to send/receive messages. For instance, an e-mail address provides the information required to get a message to a user or business anywhere around the world. Other forms of electronic communication, as well as other forms of communication, also rely on addresses or other forms of identity. In sending the communication, the sender can type in an e-mail address or more conveniently, a name of the recipient. The name is then used as a look-up to find the associated e-mail address.

Within most large enterprises that use commercial e-mail software, there exists a classic problem of misdirected e-mail among employees. When a sender decides to send a communication to a recipient, the sender types in, for instance, a name of the intended recipient in the To:, cc:, and/or bcc: fields of their e-mail client application program. Most e-mail client software packages attempt to use the entered name to look up any previous entry in the sender's personal address book associated with the e-mail client software package. In some cases such an entry is not found, which is typically the case for first or otherwise casual infrequent contacts.

In an enterprise class e-mail client software package (such as Lotus Notes® offered by International Business Machines Corporation, Armonk, N.Y.), when a personal address entry does not match, automatic steps are in place to assist in identifying the intended e-mail recipient by referring to a universal address and names book (a.k.a, universal or enterprise address book). For large enterprises with distributed e-mail packages running on multiple servers across varying geographies, this enterprise address book is periodically replicated among the various servers. As an example, Lotus® Domino® e-mail servers, offered by IBM®, are strategically located at various geographically dispersed locations where they accommodate local e-mail clients, such as Lotus Notes® clients. The servers communicate with each other across the enterprise's intranet or perhaps the internet, exchanging the e-mail traffic from users they serve within their local/respective geographies. (Lotus Notes®, Lotus® Domino®, and IBM® are registered trademarks of International Business Machines Corporation, Armonk, N.Y., U.S.A. Other names used herein may be registered trademarks, trademarks or product names of International Business Machines Corporation or other companies.)

When the sender types the name of an intended recipient whose associated e-mail address is not in their personal address book, their associated enterprise server (e.g., Domino®) then queries the shared enterprise address book for a candidate entry. The entry is retrieved, and that entry includes information used to forward the e-mail to the intended recipient. The mail server that locally serves the intended recipient user is extracted from the selected entry and a copy of the final composed e-mail is sent to the responsible local e-mail server where it is held for delivery or viewing for the intended recipient at that location.

Unfortunately, however, there are times when the wrong entry is selected. This can occur for many reasons. For example, this may occur when the user has phonetically typed, but misspelled, the intended recipient's name into their e-mail client, and that misspelled name correctly spells a uniquely defined entry, a wrong entry, that exists in the universal address book.

In other cases, the ubiquitous "auto-fill" feature may automatically fill in the various names encountered in the universal address book that match the intended-recipient's name seemingly perfectly. For instance, assume an e-mail is to be sent to Thomas J. Watson, Jr. By typing in Thomas J. Wats, the e-mail system may fill in Thomas J. Watson as having been found in the universal address book. The user will often simply accept this offered entry and send it. Unfortunately, the intended recipient was instead Thomas J. Watson, Jr. (requiring the Jr. suffix) and this intended recipient does not receive the correspondence.

SUMMARY OF THE INVENTION

Based on the foregoing, a need exists for a capability that assists the sender in sending a communication, such as an e-mail communication, to the correct intended recipient. In particular, a need exists for a capability that assists the sender in sending a communication to the correct intended recipient when there are ambiguous recipient names or other designations.

The shortcomings of the prior art are overcome and additional advantages are provided through the provision of a method of minimizing the sending of a communication to an incorrect recipient. The method includes, for instance, identifying in a communication a recipient to receive the communication; determining, in response to the identifying, whether the identified recipient is indicated as an ambiguous recipient; and specifying that the identified recipient is indicated as an ambiguous recipient, in response to the determining indicating that the identified recipient is indicated as an ambiguous recipient.

Systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 2 depicts one example of a communication to be sent to a plurality of receivers, in accordance with an aspect of the present invention;

DETAILED DESCRIPTION OF THE INVENTION

In accordance with an aspect of the present invention, a capability is provided to reduce the risk of sending a communication to the wrong recipient when there are ambiguous recipient designations (e.g., names, addresses, or any other type of user indications) in a repository, such as a local, remote, or shared address book.

Figure 1:
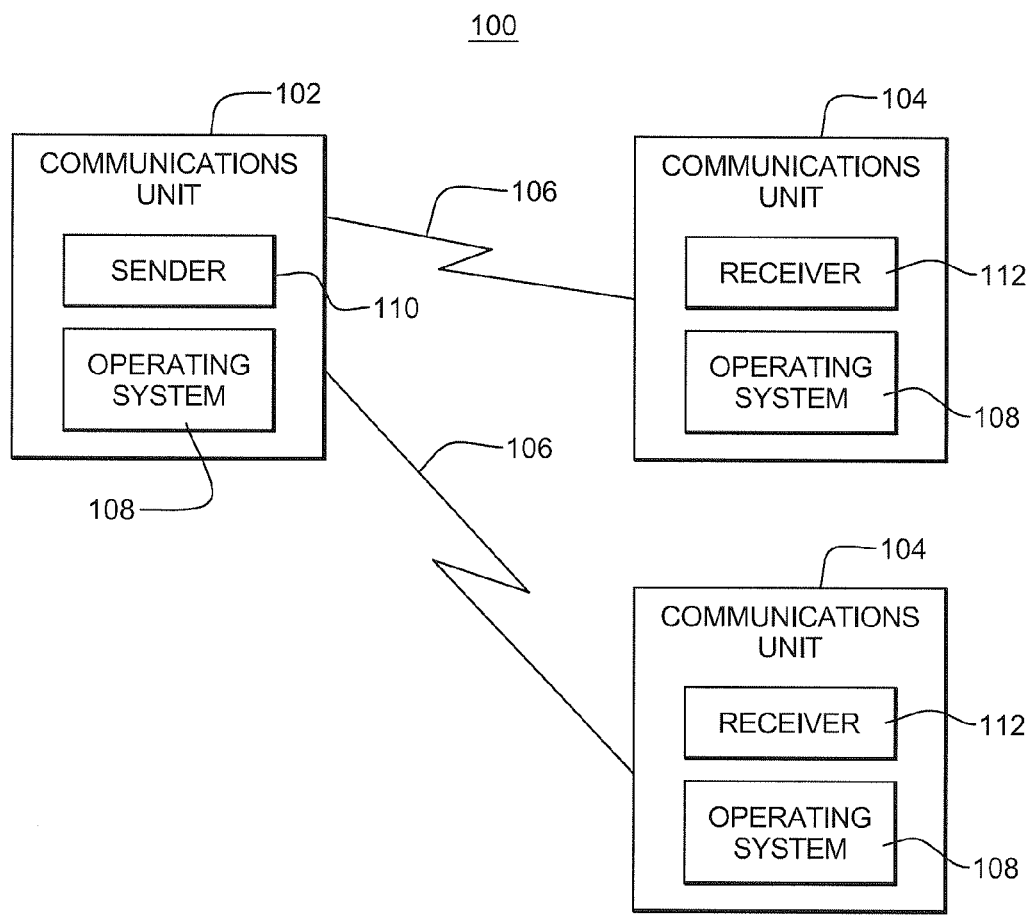
FIG. 1 depicts one example of a communications environment to incorporate and use one or more aspects of the present invention.

One embodiment of a communications environment to incorporate and use one or more aspects of the invention is described with reference to FIG. 1. A communications environment 100 may include, for instance, a communications unit 102 coupled to a plurality of other communications units 104 via one or more connections 106. A communications unit may include, for instance, a personal computer, a laptop, a handheld unit, a workstation, a mainframe, a mini computer, a node or any other type of unit capable of sending and/or receiving e-mails or other communications. Communications unit 102 may or may not be the same type of communications unit as communications units 104. Additionally, each of communications units 104 may or may not be the same type of unit as another communications unit 104. The connections coupling the units are, for instance, any type of network connection, such as an internet connection, a local area network (LAN), a wide area network (WAN); a token ring; an Ethernet connection, etc.

Each communications unit 102, 104 executes, for example, an operating system 108, such as, for instance, AIX®, offered by International Business Machines Corporation, Armonk, N.Y.; Linux; Windows®; or other operating systems, etc. (AIX® and IBM® are registered trademarks of International Business Machines Corporation, Armonk, N.Y., U.S.A. Windows® is a registered trademark of Microsoft Corporation, Redmond, Wash. Other names used herein may be registered trademarks, trademarks or product names of International Business Machines Corporation or other companies.) The operating system of one communications unit may be the same or different from another communications unit. Further, in other examples, one or more of the communications units may not include an operating system. Although three (3) communications units are depicted in FIG. 1, more or less units may be included. In one example, communications unit 102 is communicatively coupled to a number of communications units.

Communications unit 102 includes, for instance, a sender 110, which sends communications to one or more communications units 104. In this example, each of communications units 104 includes a receiver 112 that receives and may respond to the communications received from sender 110.

To communicate between a sender and a receiver, the sender prepares a communication (e.g., a note, a message, etc.) to be sent to the receiver. In one example, the messages are sent between users within the framework of an electronic communication, and a syntax is provided for the messages. One example of such a syntax is provided by the network working group request for comments (RFC) 2822 document, hereinafter RFC2822, from Qualcomm Inc., published April 2001, which is hereby incorporated herein by reference in its entirety.

In the context of electronic mail, RFC2822 messages are viewed as having an envelope and contents. The envelope includes whatever information is needed to accomplish transmission and delivery. The contents include the object to be delivered to the recipient. The above mentioned standard effects the format and some of the symantics of message content, but does not contain any information pertaining to the envelope. Under this standard, messages are passed by the help of header fields which have similar structures and are composed of a field name separated from a field body by a colon.

One example of a communication is depicted in FIG. 2. In this example, a communication 200 includes a plurality of header fields, including, for instance, a To: field 202 indicating one or more identities to which the communication is to be sent (e.g., addresses, buddy indications, phone numbers, or any type of information that indicates where a communication is to be sent or otherwise identifies how to locate a user); a cc: field 204 indicating zero or more recipients that are to be carbon copied; a bcc: field 206 indicating zero or more recipients that are to be blind carbon copied; and a subject field 208, optionally indicating the subject. The communication also includes a message 210. A communication may include more, less or different information than described above. In this example, the communication is an e-mail communication and the identities are e-mail addresses; however, in further examples, other forms of communication and/or identities can be used and benefit from one or more aspects of the present invention.

In preparing an e-mail communication, the sender includes, for instance, a designation of one or more intended recipients in, for instance, the To:, cc:, and/or bcc: fields of the e-mail communication. In this example, the designation is a name, but in other examples, it can be other than a name.

Often, during typing in the name, an auto-fill technique provided by the e-mail client is used to fill in the remaining name. For example, if an e-mail is to be sent to Thomas J. Watson, by typing in Thomas J. Wats, the e-mail protocol fills in Thomas J. Watson, as an example. This may appear to be correct, but if the intended recipient is Thomas J. Watson, Jr., then the e-mail would be sent to the incorrect recipient.

In response to typing in the name, the name is resolved to find the address of the intended recipient. It is at this name resolution phase of the e-mail that the misdirection occurs. More specifically, it occurs during the phase when the address book is referenced to identify the target recipient intended by the sender's attempt at entering what they believe to be the correct name. For example, in typing in the name, the sender's local address book is first searched. If the name is not in the local address book, then, in one embodiment, a shared enterprise address book is searched. This is typically where the problem arises. Usually, if the name is in the local address book, then it is the correct address to be used. Thus, it is assumed, in this example, that the error is provided when using the shared address book. However, in another embodiment, the same principles apply to the local address book. That is, just because it is in the local address book, it still may not be the correct intended recipient.

Once the sender settles on a particular user entry, perhaps assisted by autofill features of the e-mail client, an identification and associated e-mail address of the destination of their hosting mail service is extracted from the user's record in the common address book and the e-mail is sent to that user server for subsequent delivery to the end user. In particular, each intended recipient is looked up in the local address book to obtain an entry for the recipient. If the lookup is unsuccessful, then an entry for the recipient is retrieved from the global enterprise address book. The retrieved entry includes information that is used to send the communication to the intended recipient. Each entry includes a plurality of categories of information including, for instance, Basic, Miscellaneous, Other, Administrative, Certificates, etc. The information in these categories is used to forward the e-mail to the intended recipient, as is known.

In accordance with an aspect of the present invention, the point in this sequence of events to recognize and intercept the problem is during the point in time that the user entry (or record) is retrieved from the address book (e.g., the shared enterprise address book). Thus, in one example, a flag or other indicator is included in the user's record that corresponds to the name. The indicator provides an ambiguity warning that indicates to the sender that the sender is composing an e-mail and relying upon an address book record that has been signaled as frequently misdirected.

Figure 3A:
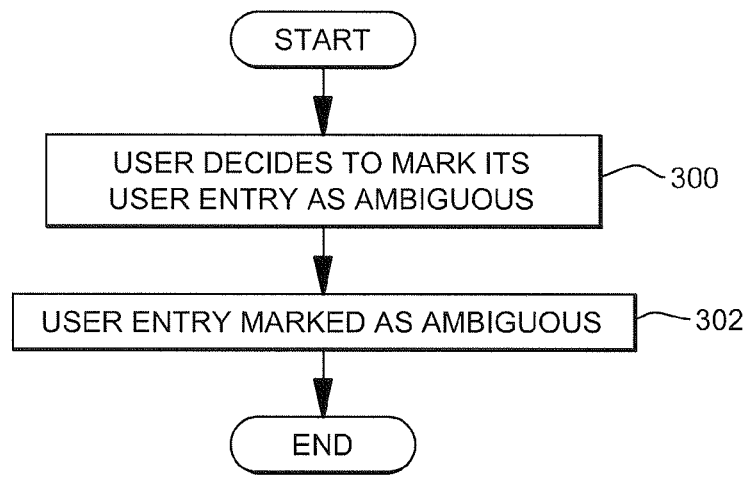
FIG. 3A depicts one embodiment of the logic to mark a user designation as ambiguous, in accordance with an aspect of the present invention.

One embodiment of the logic to include an ambiguity indicator in the user's entry is described with reference to FIG. 3A. Initially, a user decides to mark its user entry as ambiguous, STEP 300. Typically, this determination is made when the user receives a number of misdirected e-mails. For instance, Thomas J. Watson may realize that he is receiving a number of e-mails directed to Thomas J. Watson, Jr. Thus, Thomas J. Watson and Thomas J. Watson, Jr. can collaboratively agree or independently decide to warn e-mail clients of the ambiguity. In response to making this decision, the user's entry is so marked, STEP 302. In one example, this includes adding an indicator to one of the categories of a typical user's entry. As an example, the indicator is added to the Miscellaneous or Other category of the entry. However, in another example, it can be added to other categories or to even other places within the entry. With this indicator, when the sender selects the name of the recipient to receive it's e-mail, an ambiguity dialog box is provided warning the sender that the recipient has taken steps to alert users attempting to address him or her that they are susceptible of being sent e-mail intended for someone else.

In one example, this warning is provided the first time that the sender utilizes this particular name or address. After that, the address is added to its local address book and such a warning is not provided again. In other embodiments, however, the warning is provided each time that the sender selects that name or e-mail address, or a prompt can be provided asking the sender after the first use whether they would like to see this warning again.

The warning that is raised presents the opportunity to the sender to re-confirm the action. Such an ambiguity prompt in these circumstances can insist on a more in-depth confirmation that the user is in fact selecting the correct recipient. The prompt may include flashing the location, phone number, work location, or possibly even a photograph or reporting chain to the sender to provide information that the sender can use to identify whether the e-mail address of the intended recipient is correct.

As an alternative extension to simply warning the sender of the ambiguity, provisions may be included for listing one or more other users often confused with that user. For example, Thomas J. Watson may register an ambiguity indicator and further list Thomas J. Watson, Jr.; Thomas Watson; T. J. Watson; etc. as names frequently confused with Thomas J. Watson.

Further details relating to one embodiment for marking the user entry are described with reference to FIG. 3B. In this example, it is assumed that the user cannot update its own entry. In other embodiments, however, the user is authorized to update its own entry, and thus, the user sets the indicator in its user entry.

Figure 3B:
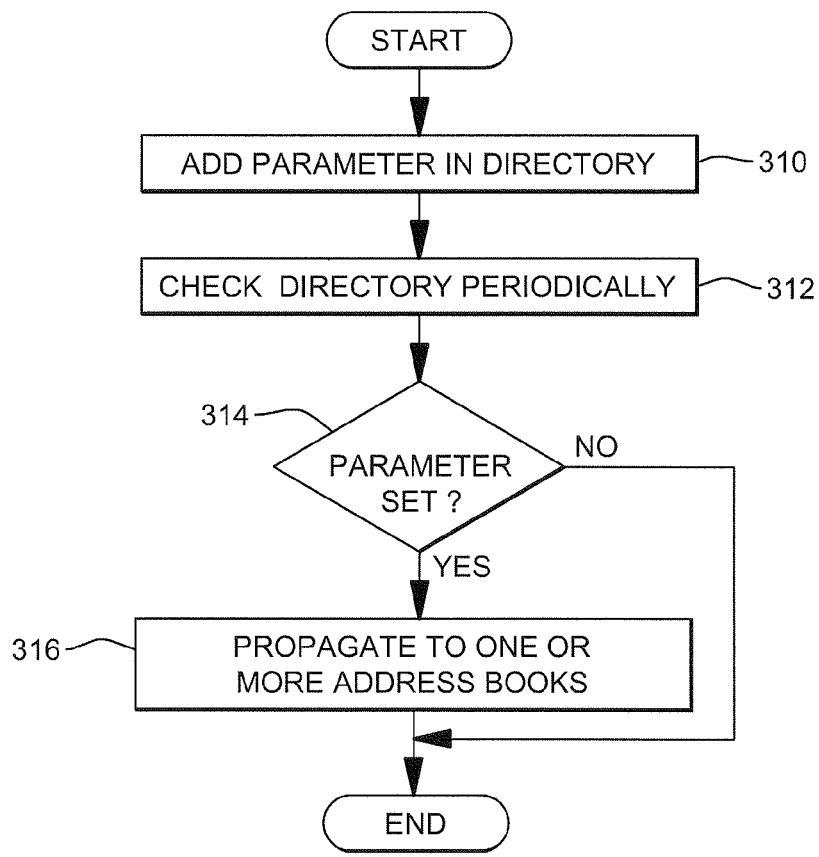
FIG. 3B depicts one embodiment of further details associated with marking the designation as ambiguous, in accordance with an aspect of the present invention.

With reference to FIG. 3B, in many enterprises, the average user is not authorized to edit the enterprise address book, nor is that user aware of the infrastructure. Instead, in such enterprises, the average user has a more familiar place to effect such a change to their directory information. This is their enterprise electronic directory (i.e., their company phone book), which typically offers a convenient and well-know interface for editing or modifying various settings. Thus, in one embodiment, a parameter is added to the appropriate phone book (e.g., an enterprise directory, such as the BluePages of IBM®) that indicates whether the user has experienced a high level of misdirected e-mail. In particular, from a user interface perspective, an input area is made available to reflect the likelihood of misdirected e-mails. In this input area, the user can set the parameter to indicate ambiguity, STEP 310. Optionally, or through collaboration with a common victim of such ambiguity resulting in misdirected e-mails, the other party can be added to the database. For example, Thomas J. Watson's entry may reflect a frequent mis-selection with Thomas J. Watson, Jr.'s record.

Thereafter, the parameter included in the directory, such as the BluePages directory, is periodically (e.g., daily, hourly, etc.) checked to determine if any parameters have been added or set, STEP 312. If a parameter has been set, INQUIRY 314, that indication is propagated and reflected in one or more address books, such as the shared public address book of the company, STEP 316. For instance, an indicator in the shared book is turned on to indicate ambiguity. This then becomes an alert to the hosting servers (e.g., Lotus Notes® Domino® (home) Servers) that are used for preparing/distributing e-mails within the enterprise. When the originator is composing an e-mail and references the enterprise address book, the ambiguous names window is presented to the originator alerting the originator to the susceptibility of selecting the wrong recipient. This alert may be graphical, audio, a different font, italics, color, etc. The sender can then scrutinize the recipient's designation and either confirm it or change it. The confirmation can be implicit (e.g., simply us the selected designation) or explicit in requiring the sender to respond to a confirmation prompt. Although in the above example the indicator is added to the shared enterprise address book, in a further example, it may also or alternatively be added to the local address book.

Figure 4:
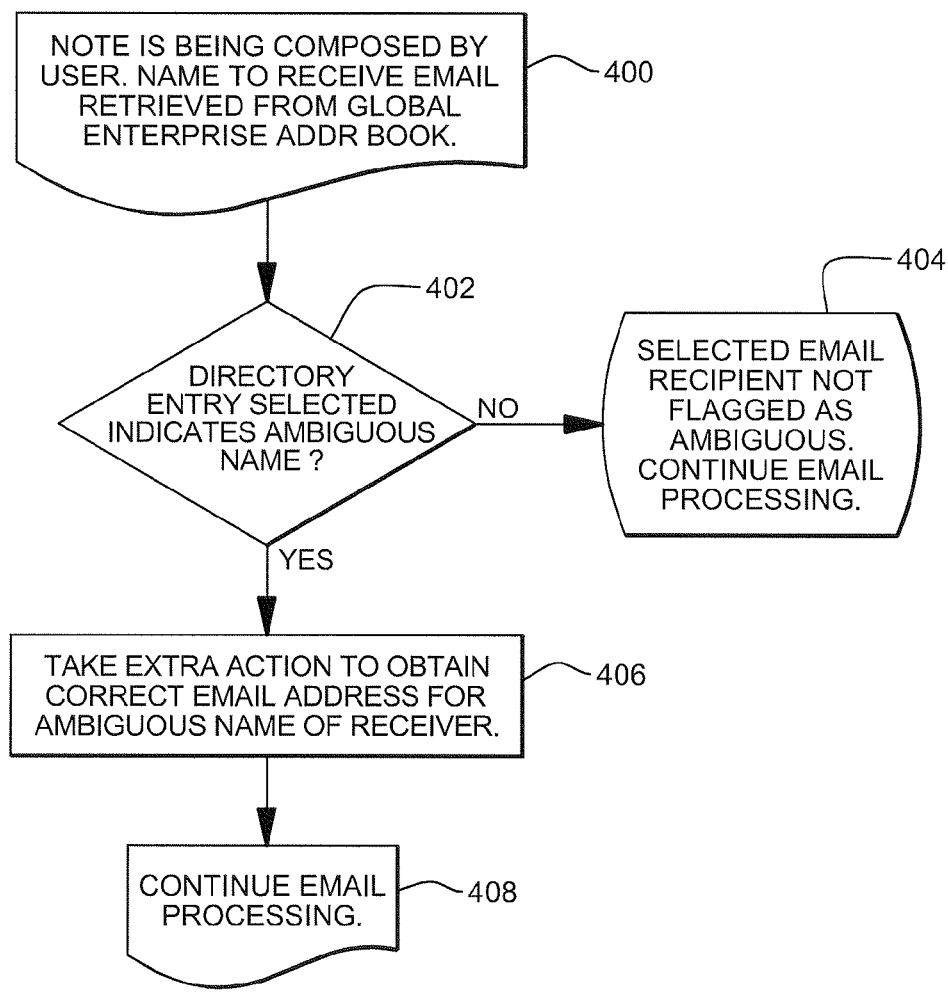
FIG. 4 depicts one embodiment of the logic to facilitate sending a communication to a correct intended recipient, in accordance with an aspect of the present invention.

One embodiment of logic employing the indicator to specify an ambiguous recipient is described with reference to FIG. 4. In one example, a communication is composed by a sender or originator, STEP 400. During composition, the e-mail originator types the name of an intended recipient. In response thereto, the e-mail client attempts to resolve the name of the intended recipient by first searching the local address book. If the intended recipient's name is found in the local directory, then the intended recipient is not considered ambiguous, in this example. However, as stated above, in a further example, an ambiguity indicator may also be used with names in a local address book. If the name is not found in the local directory, the e-mail client searches the global or remote directory. If the name is found in the global directory, then an ambiguous indicator is checked to determine if the directory entry selected indicates an ambiguous name, INQUIRY 402. If the target user is not ambiguous (i.e., there is no indication that its designation is likely to be confused with one or more other designations in the directory), then the e-mail address is used to send the communication, and e-mail processing continues as normal, STEP 404.

However, if the intended recipient is flagged as having an ambiguous name, then action is taken to resolve the receiver to the proper name and e-mail address prior to processing the e-mail, as described below, STEP 406. After resolution, typical e-mail processing continues, STEP 408.

Figure 5:
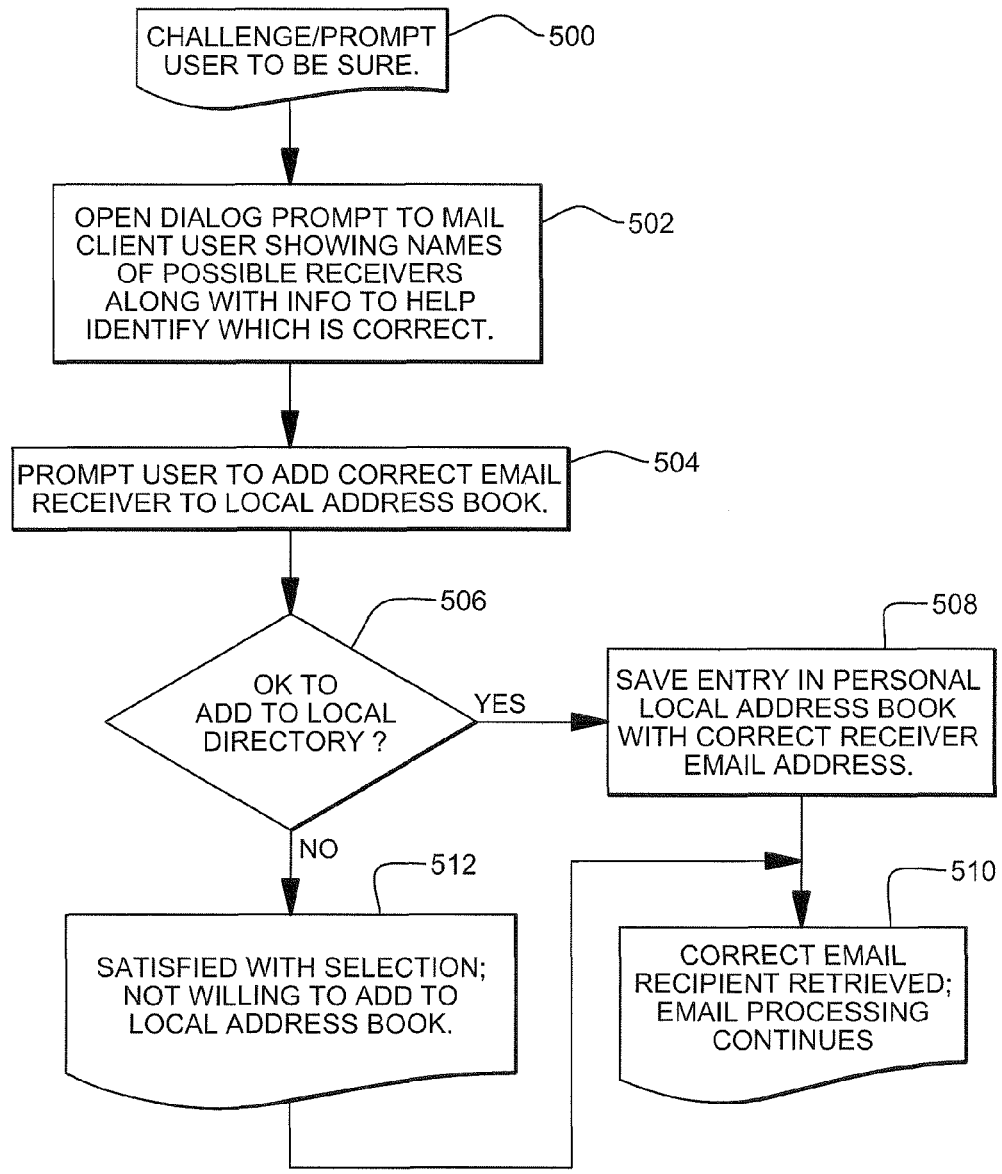
FIG. 5 depicts one embodiment of the logic to obtain a correct identity for an ambiguous recipient, in accordance with an aspect of the present invention.

With reference to FIG. 5, one embodiment of the logic to resolve an ambiguous name to the correct intended recipient is described. Initially, a challenge or prompt is provided to the sender to warn the sender of the ambiguity, STEP 500. Further, in one example, a list of ambiguous names is obtained from the remote directory to be provided as a guide of names that may have been intended. In addition or alternatively, information that could be of use in determining the correct receiver, such as work location, job title, photo, etc., is composed. A dialog is then opened to the e-mail originator by the e-mail client, and the pertinent information for identifying the correct receiver is presented to the originator, STEP 502. The originator selects the appropriate e-mail receiver from the dialog prompt.

Moreover, in an attempt to avoid the ambiguous process again for this e-mail receiver, the e-mail client questions the e-mail originator to determine if this e-mail receiver should be added to the local directory, STEP 504. If the originator indicates to do so, INQUIRY 506, then the selected e-mail receiver is added to the local address book and in doing so, in this embodiment, avoids using the public enterprise directory and ambiguity prompt in the future, STEP 508. The ambiguous e-mail receiver is now resolved to the proper e-mail receiver and registered in the private e-mail address book avoiding ambiguous challenges for this potential e-mail recipient by this particular user. E-mail processing now continues, STEP 510.

Returning to INQUIRY 506, if the recipient is not to be added to the local directory, then the e-mail originator is satisfied with the selection and is willing to accept challenge again, STEP 512. E-mail processing then continues, STEP 510.

Although in the above example various pertinent information is specified, these are only examples. Additional, less and/or other information may be provided without departing from the spirit of the present invention. Further, the prompt to add to the local directory is optional. Yet further, even if added to the local directory, the ambiguous indicator may still be used in a further embodiment.

Described in detail above is one embodiment of a capability to minimize the sending of incorrectly addressed communications when there are ambiguous recipient designations. As one example, in response to providing a designation for an intended recipient in a communication, an indicator is checked to see if the intended recipient is indicated as having an ambiguous designation. If so, the sender carefully checks the designation. If confirmed to be correct, the communication is sent. If not, another intended recipient is selected and the process repeats.

One or more aspects of the present invention can be included in an article of manufacture (e.g., one or more computer program products) having, for instance, non-transitory computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 6:
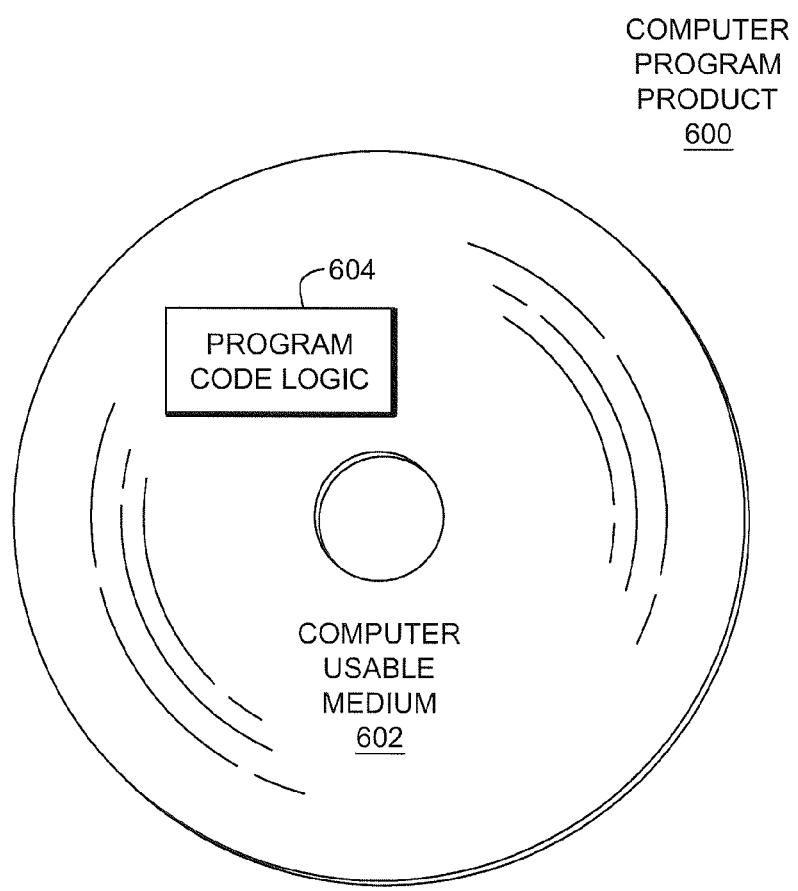
FIG. 6 depicts one embodiment of a computer program product incorporating one or more aspects of the present invention.

One example of an article of manufacture or a computer program product incorporating one or more aspects of the present invention is described with reference to FIG. 6. A computer program product 600 includes, for instance, one or more computer usable media 602 to store computer readable program code means or logic 604 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a technique is provided to minimize sending communications to incorrect recipients. This technique provides an automatic and easy way to minimize errors.

Although various embodiments are described above, these are only examples. For instance, in the above description, the example includes a shared address book and phone book of a company; however, in other examples, it may be a shared address book and/or phone book of other than a company. As an example, the shared address book may be shared by a plurality of individuals, businesses, entities and/or parties, etc. Further, an address book is only one example of a repository. Other types of repositories may be used, including, but not limited to, lists, buddy lists, directories, distribution lists or any other type of mechanism that stores designations or identities for later retrieval. Moreover, an identity is any type of information that indicates where a communication is to be sent or otherwise identifies how to locate a user, including, but not limited to, an e-mail address, a buddy indication, an indication in a phone directory or other types of addresses used in communication.

As a further example, the communications environment described above is only one example. There can be more or less communication units than described above. Also, the units can be different than that described above. As one particular example, the communications unit to send a communication may be a cell phone or other mobile device. Many other examples are also possible.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of minimizing potential misdirection of an electronic communication, the method comprising:

indicating, in a global directory of records for potential recipients of electronic communications, one or more potential recipients as ambiguous potential recipients, each potential recipient having an associated record of the global directory of records, and each potential recipient being susceptible to selection to indicate a wrong potential recipient of electronic communications, the global directory being shared by multiple originators of electronic communications, wherein the indicating comprises providing additional information associated with the records, of the global directory of records, associated with the ambiguous potential recipients as a guide to facilitate resolving potential ambiguity when an ambiguous potential recipient is selected to receive an electronic communication;

receiving, based on a selection by an originator of an electronic communication, an indication of a potential recipient to receive the electronic communication;

identifying an address for the potential recipient;

identifying a record, of the global directory of records, to which the identified address for the potential recipient resolves, wherein the record is associated with the potential recipient, and wherein a portion of the additional information associated with the records is associated with the identified record;

determining that the selected potential recipient is an ambiguous potential recipient based at least partially on the portion of additional information associated with the record, wherein the determining occurs absent any communication between the originator and the ambiguous potential recipient indicating the potential recipient as an ambiguous potential recipient; and based on the determining, automatically indicating to the originator, by a processor, that the selected potential recipient is an ambiguous potential recipient and providing to the originator at least some of the portion of additional information associated with the record to facilitate resolving any ambiguity and avoid possible misdirection of the electronic communication to the address for the potential recipient, wherein the at least some of the portion of additional information comprises a list of other potential recipients, and wherein the automatically indicating that the selected potential recipient is an ambiguous potential recipient includes providing a warning to the originator that the selected potential recipient is an ambiguous potential recipient and providing the list of other potential recipients as a guide of potential recipients that may have been intended to receive the electronic communication.

2. The method of claim 1, wherein the determining comprises checking an indicator in the additional information to determine if the selected potential recipient is an ambiguous potential recipient, wherein the indicator indicates whether the potential recipient is an ambiguous potential recipient.

3. The method of claim 2, wherein the indicating in the global directory comprises setting the indicator in the record associated with the selected potential recipient.

4. The method of claim 3, wherein the setting comprises:
specifying in a separate electronic directory, which is write accessible by the selected potential recipient, that a designation used to identify the selected potential recipient is ambiguous; and
using the specification in the separate electronic directory to set the indicator in the record associated with the selected potential recipient to indicate that the selected potential recipient is an ambiguous potential recipient.

5. The method of claim 1, further comprising:
determining, in response to the automatically indicating, whether an address of the ambiguous potential recipient is to be added to a local repository of the originator of the electronic communication; and
including the address in the local repository, in response to the determining indicating that it is to be included.

6. The method of claim 5, wherein inclusion in the local repository is an indication that the ambiguous potential recipient is no longer to be treated by the originator as an ambiguous potential recipient.

7. The method of claim 1, further comprising checking, in response to the automatically indicating, whether the ambiguous potential recipient is a correct recipient, wherein the checking comprises providing a list of ambiguous potential recipients as a guide of potential recipients that may have been intended to be selected by the originator of the electronic communication.

8. The method of claim 1, wherein the method further comprises determining, in response to the identifying the address for the potential recipient, whether the address for the selected potential recipient is included in a local address repository, and wherein the determining that the selected potential recipient is an ambiguous potential recipient is performed based at least partially on determining that the address of the selected potential recipient is not included in the local address repository.

9. A system for minimizing potential misdirection of an electronic communication, the system comprising:
a memory; and
a processor, in communication with the memory, wherein the system is configured to perform:
indicating, in a global directory of records for potential recipients of electronic communications, one or more potential recipients as ambiguous potential recipients, each potential recipient having an associated record of the global directory of records, and each potential recipient being susceptible to selection to indicate a wrong potential recipient of electronic communications, the global directory being shared by multiple originators of electronic communications, wherein the indicating comprises providing additional information associated with the records, of the global directory of records, associated with the ambiguous potential recipients as a guide to facilitate resolving potential ambiguity when an ambiguous potential recipient is selected to receive an electronic communication;
receiving, based on a selection by an originator of an electronic communication, an indication of a potential recipient to receive the electronic communication;
identifying an address for the potential recipient;
identifying a record, of the global directory of records, to which the identified address for the potential recipient resolves, wherein the record is associated with the potential recipient, and wherein a portion of the additional information associated with the records is associated with the identified record;
determining that the selected potential recipient is an ambiguous potential recipient based at least partially on the portion of additional information associated with the record, wherein the determining occurs absent any communication between the originator and the ambiguous potential recipient indicating the potential recipient as an ambiguous potential recipient; and
based on the determining, automatically indicating to the originator that the selected potential recipient is an ambiguous potential recipient and providing to the originator at least some of the portion of additional information associated with the record to facilitate resolving any ambiguity and avoid possible misdirection of the electronic communication to the address for the potential recipient, wherein the at least some of the portion of additional information comprises a list of other potential recipients, and wherein the automatically indicating that the selected potential recipient is an ambiguous potential recipient includes providing a warning to the originator that the selected potential recipient is an ambiguous potential recipient and providing the list of other potential recipients as a guide of potential recipients that may have been intended to receive the electronic communication.

10. The system of claim 9, wherein the determining comprises checking an indicator in the additional information to determine if the selected potential recipient is an ambiguous potential recipient, wherein the indicator indicates whether the potential recipient is an ambiguous potential recipient.

11. The system of claim 10, wherein the indicating in the global directory comprises setting the indicator in the record associated with the selected potential recipient.

12. The system of claim 11, wherein the setting comprises:
specifying in a separate electronic directory, which is write accessible by the selected potential recipient, that a designation used to identify the selected potential recipient is ambiguous; and
using the specification in the separate electronic directory to set the indicator in the record associated with the selected potential recipient to indicate that the selected potential recipient is an ambiguous potential recipient.

13. The system of claim 9, wherein the system is further configured to perform:
determining, in response to the automatically indicating, whether an address of the ambiguous potential recipient is to be added to a local repository of the originator of the electronic communication; and
including the address in the local repository, in response to the determining indicating that it is to be included.

14. A computer program product for minimizing potential misdirection of an electronic communication, said computer program product comprising:
a non-transitory computer readable storage medium readable by a processor and storing instructions for execution by the processor for performing a method comprising:
indicating, in a global directory of records for potential recipients of electronic communications, one or more potential recipients as ambiguous potential recipients, each potential recipient having an associated record of the global directory of records, and each potential recipient being susceptible to selection to indicate a wrong potential recipient of electronic communications, the global directory being shared by multiple originators of electronic communications, wherein the indicating comprises providing additional information associated with the records, of the global directory of records, associated with the ambiguous potential recipients as a guide to facilitate resolving potential ambiguity when an ambiguous potential recipient is selected to receive an electronic communication;

receiving, based on a selection by an originator of an electronic communication, an indication of a potential recipient to receive the electronic communication;

identifying an address for the potential recipient;

identifying a record, of the global directory of records, to which the identified address for the potential recipient resolves, wherein the record is associated with the potential recipient, and wherein a portion of the additional information associated with the records is associated with the identified record;

determining that the selected potential recipient is an ambiguous potential recipient based at least partially on the portion of additional information associated with the record, wherein the determining occurs absent any communication between the originator and the ambiguous potential recipient indicating the potential recipient as an ambiguous potential recipient; and based on the determining, automatically indicating to the originator that the selected potential recipient is an ambiguous potential recipient and providing to the originator at least some of the portion of additional information associated with the record to facilitate resolving any ambiguity and avoid possible misdirection of the electronic communication to the address for the potential recipient, wherein the at least some of the portion of additional information comprises a list of other potential recipients, and wherein the automatically indicating that the selected potential recipient is an ambiguous potential recipient includes providing a warning to the originator that the selected potential recipient is an ambiguous potential recipient and providing the list of other potential recipients as a guide of potential recipients that may have been intended to receive the electronic communication.

15. The computer program product of claim 14, wherein the determining comprises checking an indicator in the additional information to determine if the selected potential recipient is an ambiguous potential recipient, wherein the indicator indicates whether the potential recipient is an ambiguous potential recipient.

16. The computer program product of claim 15, wherein the indicating in the global directory comprises setting the indicator in the record associated with the selected potential recipient, the setting comprising:

specifying in a separate electronic directory, which is write accessible by the selected potential recipient, that a designation used to identify the selected potential recipient is ambiguous; and using the specification in the separate electronic directory to set the indicator in the record associated with the selected potential recipient to indicate that the selected potential recipient is an ambiguous potential recipient.

17. The computer program product of claim 14, wherein the method further comprises:

determining, in response to the automatically indicating, whether an address of the ambiguous potential recipient is to be added to a local repository of the originator of the electronic communication; and including the address in the local repository, in response to the determining indicating that it is to be included.

* * * * *